(12) United States Patent
Yamada

(10) Patent No.: US 11,900,044 B2
(45) Date of Patent: Feb. 13, 2024

(54) DISPLAY METHOD AND DISPLAY APPARATUS FOR DISPLAYING PAGE IMAGE AND THUMBNAIL IMAGES OF PAGE IMAGE

(71) Applicant: SEIKO EPSON CORPORATION, Tokyo (JP)

(72) Inventor: Yusuke Yamada, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/815,850

(22) Filed: Jul. 28, 2022

(65) Prior Publication Data

US 2023/0029973 A1 Feb. 2, 2023

(30) Foreign Application Priority Data

Jul. 28, 2021 (JP) ................. 2021-122953

(51) Int. Cl.
*G06F 40/00* (2020.01)
*G06F 40/106* (2020.01)

(52) U.S. Cl.
CPC ................. *G06F 40/106* (2020.01)

(58) Field of Classification Search
CPC .................................. G06F 40/106
See application file for complete search history.

(56) References Cited

U.S. PATENT DOCUMENTS

| | | | | |
|---|---|---|---|---|
| 7,152,210 B1 * | 12/2006 | Van Den Hoven | ......... | G06F 3/04842 715/716 |
| 7,769,794 B2 * | 8/2010 | Moore | ......... | G06F 16/168 707/831 |
| 2004/0070631 A1 * | 4/2004 | Brown | ......... | G06F 3/0481 715/838 |
| 2008/0178120 A1 * | 7/2008 | Yamamoto | ......... | G06F 16/50 715/838 |
| 2009/0007019 A1 * | 1/2009 | Kobayashi | ......... | G06F 16/51 715/838 |
| 2009/0249210 A1 * | 10/2009 | Sheldon | ......... | G06F 1/3231 715/730 |

(Continued)

FOREIGN PATENT DOCUMENTS

| | | | |
|---|---|---|---|
| EP | 2695363 A1 | * | 3/2013 |
| JP | 2011-40002 | | 2/2011 |
| JP | 2015-198440 | | 11/2015 |
| JP | 2017-142711 | | 8/2017 |
| JP | 2017225185 A | * | 12/2017 |
| JP | P2018-60517 | | 4/2018 |
| JP | 2020-86111 | | 6/2020 |
| JP | 2020-123010 | | 8/2020 |

*Primary Examiner* — Barbara M Level
(74) *Attorney, Agent, or Firm* — WORKMAN NYDEGGER

(57) ABSTRACT

A display method of causing a display apparatus having a display screen to display a document is provided. The method includes a displaying step of causing a page image that is an image of a page of the document and thumbnail images of pages to be displayed on the display screen, a first receiving step of receiving a first operation for issuing an instruction for enlarging the page image, and an enlarging step of, in response to receiving the first operation, causing the page image displayed in the display area to be enlarged and displayed and causing the thumbnail images to be moved in a first direction in the display area. In the enlarging step, the thumbnail images are enlarged compared to those before the execution of the enlarging step with some portions of the thumbnail images being hidden, and the display in the display area is updated.

12 Claims, 7 Drawing Sheets

(56) References Cited

U.S. PATENT DOCUMENTS

| | | |
|---|---|---|
| 2011/0043696 A1 | 2/2011 | Onogi et al. |
| 2012/0140278 A1* | 6/2012 | Sousa .................... G06F 3/121 |
| | | 358/1.15 |
| 2018/0098049 A1 | 4/2018 | Sugano et al. |
| 2018/0129653 A1* | 5/2018 | Wang ................... G06F 16/532 |
| 2018/0246627 A1* | 8/2018 | Suzuki ................. G06F 3/0482 |
| 2020/0098088 A1* | 3/2020 | Takano ............... G06F 3/04845 |
| 2020/0168178 A1 | 5/2020 | Yamada |
| 2020/0241710 A1 | 7/2020 | Yamada |

* cited by examiner

DISPLAY METHOD AND DISPLAY APPARATUS FOR DISPLAYING PAGE IMAGE AND THUMBNAIL IMAGES OF PAGE IMAGE

The present application is based on, and claims priority from JP Application Serial Number 2021-122953, filed Jul. 28, 2021, the disclosure of which is hereby incorporated by reference herein in its entirety.

BACKGROUND

1. Technical Field

The present disclosure relates to a display method and a display apparatus.

2. Related Art

Techniques for displaying pages of a document on a display apparatus, such as a smart phone, are known. A display apparatus described in JP-A-2020-86111 displays images of pages of an electronic book or electro-photographs as main images and displays thumbnail images as a search screen for searching page images. The configuration according to JP-A-2020-86111 displays a first display screen and a second display screen with a boundary line on a display section of the display apparatus and displays thumbnail images on the first display screen and main images on the second display screen.

When the display section is small, the first display screen and the second display screen are also small, and users may find it difficult to see both the main images and the thumbnail images.

SUMMARY

According to an aspect of the present disclosure for solving the above-described problem, a display method of causing a display apparatus having a display screen to display a document is provided. The method includes a displaying step of causing a page image that is an image of a page of the document and thumbnail images of pages to be displayed in a display area on the display screen, a first receiving step of receiving a first operation for issuing an instruction for enlarging the page image, and an enlarging step of, in response to receiving the first operation, causing the page image displayed in the display area to be enlarged and displayed and causing the thumbnail images to be moved in a first direction in the display area. In the enlarging step, the thumbnail images are enlarged compared to those before the execution of the enlarging step with some portions of the thumbnail images being hidden, and the display in the display area is updated.

According to another aspect of the present disclosure for solving the above-described problem, a display apparatus includes a display section having a display screen, a display control unit configured to cause the display apparatus to display a page image that is an image of a page of the document and thumbnail images of pages in a display area on the display screen, and a reception unit configured to receive an operation. The display control unit, in response to the reception unit receiving a first operation for issuing an instruction for enlarging the page image, performs display updating processing for enlarging the page image displayed in the display area and displaying the page image, and in the display updating processing, moves the display locations of the thumbnail images in a first direction in the display area and enlarges the thumbnail images compared to those before the execution of the display updating processing with some portions of the thumbnail images being hidden.

DESCRIPTION OF EXEMPLARY EMBODIMENTS

Hereinafter, an embodiment of the present disclosure will be described with reference to the attached drawings.

Figure 1:
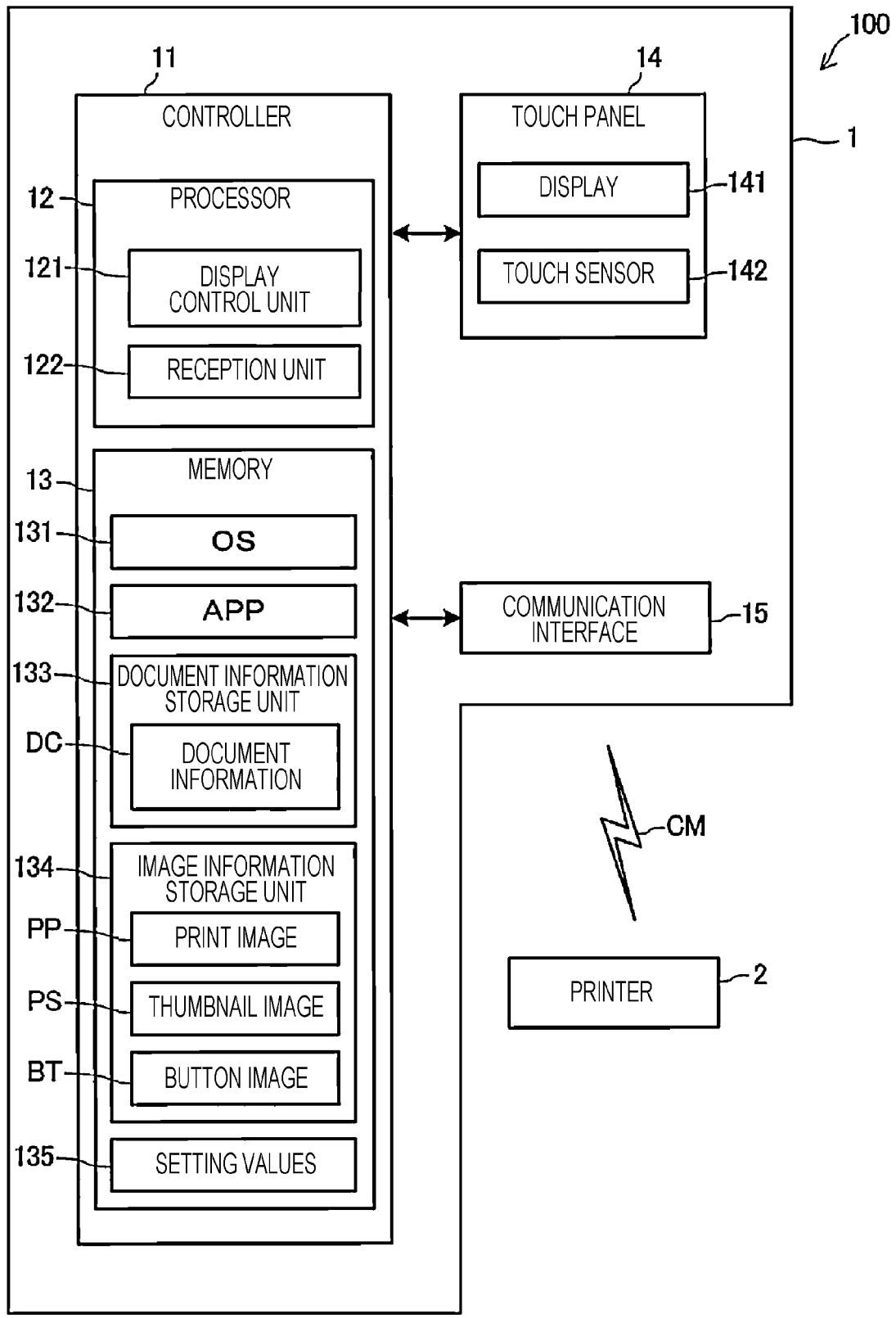
FIG. 1 illustrates a configuration of a printing system according to an embodiment.

A printing system 100 according to the embodiment is described. FIG. 1 illustrates an example of a configuration of the printing system 100 and a smart phone 1.

The printing system 100 includes the smart phone 1 and a printer 2. The smart phone 1 is communicably coupled to the printer 2 via, for example, short-range wireless communication, such as Bluetooth (registered trademark) or near-field communication (NFC). The smart phone 1 may be communicably coupled to the printer 2 via, for example, wireless communication, such as Wi-Fi (registered trademark). Wi-Fi wireless communication enables high-speed communication faster than short-range wireless communication, such as NFC.

The smart phone 1 selects a print target in accordance with a user operation and sends print command information (CM) for issuing an instruction for printing the selected print target. The smart phone 1 may send print command information CM to the printer 2 directly or via a server device. The printer 2 prints the print target on a print medium such as a print sheet in accordance with the print command information CM from the smart phone 1.

The smart phone 1 is communicably coupled to a personal computer or a server device (not illustrated) via, for example, wireless communication, such as Wi-Fi. The smart phone 1 acquires document information DC from a personal computer or a server device.

The smart phone 1 includes a controller 11, a touch panel 14, and a communication interface 15. The controller 11 controls components in the smart phone 1. The touch panel 14 receives various operations from users and displays various images. The touch panel 14 includes a display 141, such as a liquid crystal display (LCD), and a touch sensor 142.

The display 141 displays various images in accordance with instructions from the controller 11. The touch sensor 142 and a display surface of the display 141 are integrally formed to receive touch operations from users. The touch sensor 142 includes, for example, a capacitive sensor or a pressure-sensitive sensor. A touch operation is an operation of causing an indicator, such as a hand or a finger of a user or a stylus pen for input, to come into contact with the surface of the display 141. The touch sensor 142 generates an operation signal including information of a contact location in response to a touch operation. The touch sensor 142 outputs the operation signal to the controller 11. The touch sensor 142 may be configured to detect multiple touch operations, which are touch operations performed simultaneously at multiple locations on the touch sensor 142. The display 141 is an example of a "display screen". The touch sensor 142 may be referred to as an "input unit". The touch panel 14 is an example of a "display unit".

Examples of user operations performed on the touch sensor 142 include a long-touch operation, a swipe operation, and a pinch operation, as well as a touch operation of causing an indicator to come into contact with a surface of the display 141. A long-touch operation is an operation of holding an indicator in contact with the display 141 for a predetermined time period or more on the touch sensor 142. A swipe operation may be referred to as a flick operation. A swipe operation is an operation of causing an indicator to come into contact with the display 141 and move while maintaining the contact state. A pinch operation is an operation of causing a plurality of indicators to come into contact with the touch sensor 142 and change the distance between the indicators while maintaining the indicators in contact with the touch sensor 142. An operation of touching a location on the display 141 for less than or equal to a predetermined time period may be referred to as a tap operation. The touch sensor 142 may be configured to determine the types of operations and to output operation signals corresponding to the types of operations to the controller 11. Alternatively, the touch sensor 142 may be configured to generate an operation signal indicating a contact location in a predetermined sampling cycle. In such a case, the controller 11 may be configured to determine the type of a user operation in accordance with an operation signal that is input from the touch sensor 142.

The communication interface 15 includes a wireless communication interface circuit having an antenna, a radio frequency (RF) circuit, an encoder, a decoder, and the like. The communication interface 15 communicates with the printer 2 via short-range wireless communication, such as Bluetooth or NFC, in accordance with instructions from the controller 11. The communication interface 15 communicates with a server device (not illustrated) or the printer 2 via wireless communication, such as Wi-Fi. The smart phone 1 is an example of a "display apparatus".

The communication interface 15 according to the embodiment communicates with the printer 2 via short-range wireless communication, such as Bluetooth or NFC; however, the communication methods are not limited to these examples. The communication interface 15 may communicate with the printer 2 via another type of wireless communication, such as Wi-Fi. The communication interface 15 may communicate with the printer 2 via wired communication in accordance with the Ethernet (registered trademark) standard, or the like.

The controller 11 includes a processor 12 and memory 13. The memory 13 is nonvolatile storage that stores programs to be processed by the processor 12 and data. The memory 13 may be magnetic storage such as a hard disk drive (HDD), semiconductor storage such as a solid state drive (SSD), semiconductor storage such as a flash read-only memory (ROM), or another type of nonvolatile storage. The memory 13 may include random access memory (RAM) as a work area for the processor 12. The memory 13 stores data to be processed by the controller 11 and programs to be processed by the processor 12.

The memory 13 stores programs to be processed by the processor 12, for example, an operating system (OS) 131 and an application program (APP) 132. The OS 131 is a control program for implementing basic functions of the smart phone 1 and provides a platform for the APP 132. The OS 131 is, for example, Android (registered trademark) OS, Windows (registered trademark) OS, or iOS (registered trademark); alternatively, the OS 131 may be another operating system.

The APP 132 is a program for implementing specific functions of the smart phone 1. The APP 132 according to the embodiment has a function of displaying images in accordance with document data. After the power is switched on, the smart phone 1 loads and implements the OS 131 and becomes ready for the implementation of the APP 132. The smart phone 1 starts the APP 132 in accordance with a user operation or the like. In addition to the APP 132, the smart phone 1 may implement a plurality of application programs. In other words, the memory 13 may store a plurality of application programs, and description of the configuration of the memory 13 is omitted.

The memory 13 stores settings values 135. The settings values 135 include reference values and settings values referred to by the processor 12 during implementing processing.

The processor 12 may be a single processor, or a plurality of processors may function as the processor 12. The processor 12 implements a program stored in the memory 13 to control components of the smart phone 1.

The processor 12 according to the embodiment implements the OS 131 and the APP 132 to control components of the smart phone 1; however, such implementation may be carried out by the controller 11, which may be provided as an application specific integrated circuit (ASIC). Such an ASIC may implement processing with mounted functions. The controller 11 may be a signal processing circuit. Such a signal processing circuit may implement processing through signal processing.

The controller 11 includes a display control unit 121 and a reception unit 122 as function blocks.

The processor 12 implements the APP 132, thereby functioning as the display control unit 121 and the reception unit 122. The processor 12 implements the APP 132, thereby causing the memory 13 to function as a document information storage unit 133 and an image information storage unit 134.

The document information storage unit 133 stores document information DC. The document information DC is data in a file format such as Portable Document Format (PDF) or Joint Photographic Experts Group (JPEG). The document information storage unit 133 stores at least a piece of document information DC per document. The document information DC includes various kinds of information about page numbers, order, size, shape, and the like of pages of a document. The document information storage unit 133 may store a plurality of pieces of document information DC. The smart phone 1 acquires, for example, document information DC from a personal computer or a server device via the communication interface 15 and stores the acquired document information DC in the document information storage unit 133.

The image information storage unit 134 stores various images and screens to be displayed on the display 141. The image information storage unit 134 stores print images PP, thumbnail images PS, and button images BT. A print image PP is used to form a page image PG displayed on the display 141. More specifically, the smart phone 1 displays a page image PG in accordance with a print image PP. A preview screen 200 includes thumbnail images PS and button images BT. A button image BT is an image for a user to perform a touch operation to switch a display mode, which will be described below. A page image PG, thumbnail images PS, and button images BT will be further described with reference to FIG. 2.

The display control unit 121 controls the display 141 such that the display 141 displays a screen indicating information about the operation status of the smart phone 1 and information about the implementation of the APP 132. The display control unit 121, for example, generates display data for displaying the preview screen 200. The display control unit 121 outputs display data to the display 141 to cause the display 141 to display the preview screen 200.

The preview screen 200 is a screen on the smart phone 1 for a user to visually check the state of a print product to be printed by the printer 2 before performing printing. The preview screen 200 is displayed after the start of the APP 132 in response to a user operation. Accordingly, the preview screen 200 may be displayed for the user to browse a document when the user is not instructing the printer 2 to perform printing. In such a case, the preview screen 200 may be referred to as a browsing screen for browsing a document.

The display control unit 121 generates a page image PG, which will be described below, from a print image PP. The display control unit 121 generates display data for a preview screen 200 based on a page image PG, a button image BT stored in the memory 13, and a thumbnail image PS.

When the reception unit 122 receives a user operation, the display control unit 121 switches display modes of the preview screen 200 in response to the operation. The display modes on the preview screen 200 will be described with reference to FIG. 2, FIG. 3, and FIG. 4.

The reception unit 122 receives an operation performed by a user on the smart phone 1. The reception unit 122 receives an operation performed by a user in accordance with an operation signal input via the touch sensor 142. The reception unit 122 has at least a function of receiving a touch operation. The reception unit 122 may have, for example, a function of determining the above-described long-touch operation, swipe operation, and pinch operation. The reception unit 122 determines content of an operation performed by a user in accordance with an operation location on the display 141. The reception unit 122 determines, for example, an operation performed on a button image BT and an operation performed on a thumbnail image PS.

Figure 2:
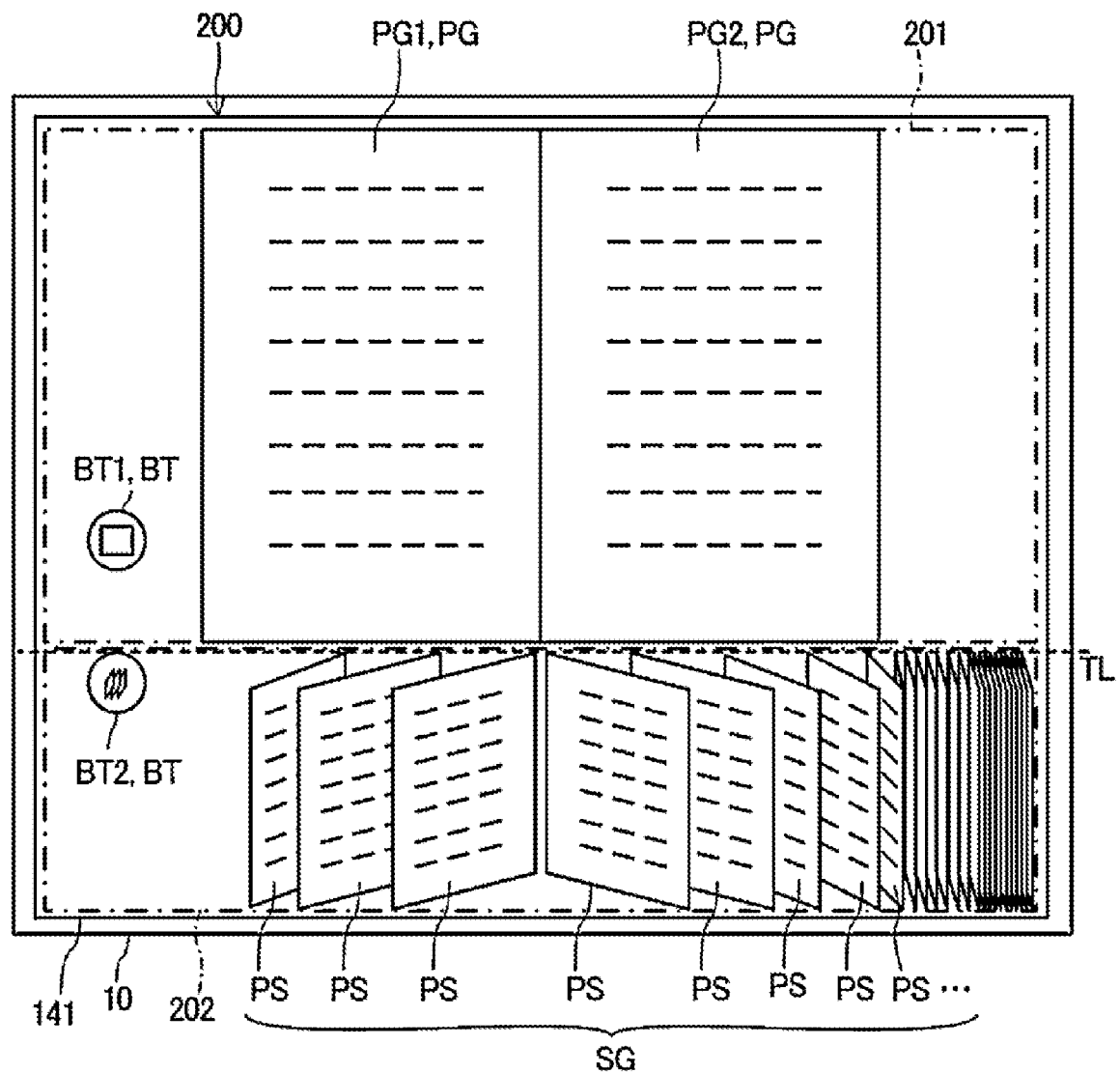
FIG. 2 illustrates an example of a preview screen in a normal display mode.

FIG. 2 illustrates a preview screen 200, which is in a normal display mode, displayed on the display 141. FIG. 2 illustrates a body 10 of the smart phone 1. The smart phone 1 has the display 141 on the front of the body 10. Almost the entire area of the display 141 exposed on the front of the body 10 is a display area of the display 141.

The preview screen 200 includes a document display area 201 and a thumbnail display area 202. The preview screen 200 is displayed on the entire display area of the display 141 in FIG. 2, and FIG. 3, and FIG. 4, which will be described below. However, the preview screen 200 may be displayed on a portion of the display area of the display 141. The display area of the display 141 may completely overlap the preview screen 200.

The display state illustrated in FIG. 2 is referred to as a normal display mode. In the normal display mode, the document display area 201 and the thumbnail display area 202 are disposed so as not to overlap each other on the display area of the display 141. In FIG. 2, the document display area 201 is disposed in an upper portion of the preview screen 200 and the thumbnail display area 202 is disposed in a lower portion of the preview screen 200. However, the positional relationship between the document display area 201 and the thumbnail display area 202 may be reversed.

In FIG. 2, a space is illustrated between the document display area 201 and the thumbnail display area 202 to facilitate understanding of the drawing; however, the document display area 201 and the thumbnail display area 202 may be disposed on the preview screen 200 with no space.

Figure 3:
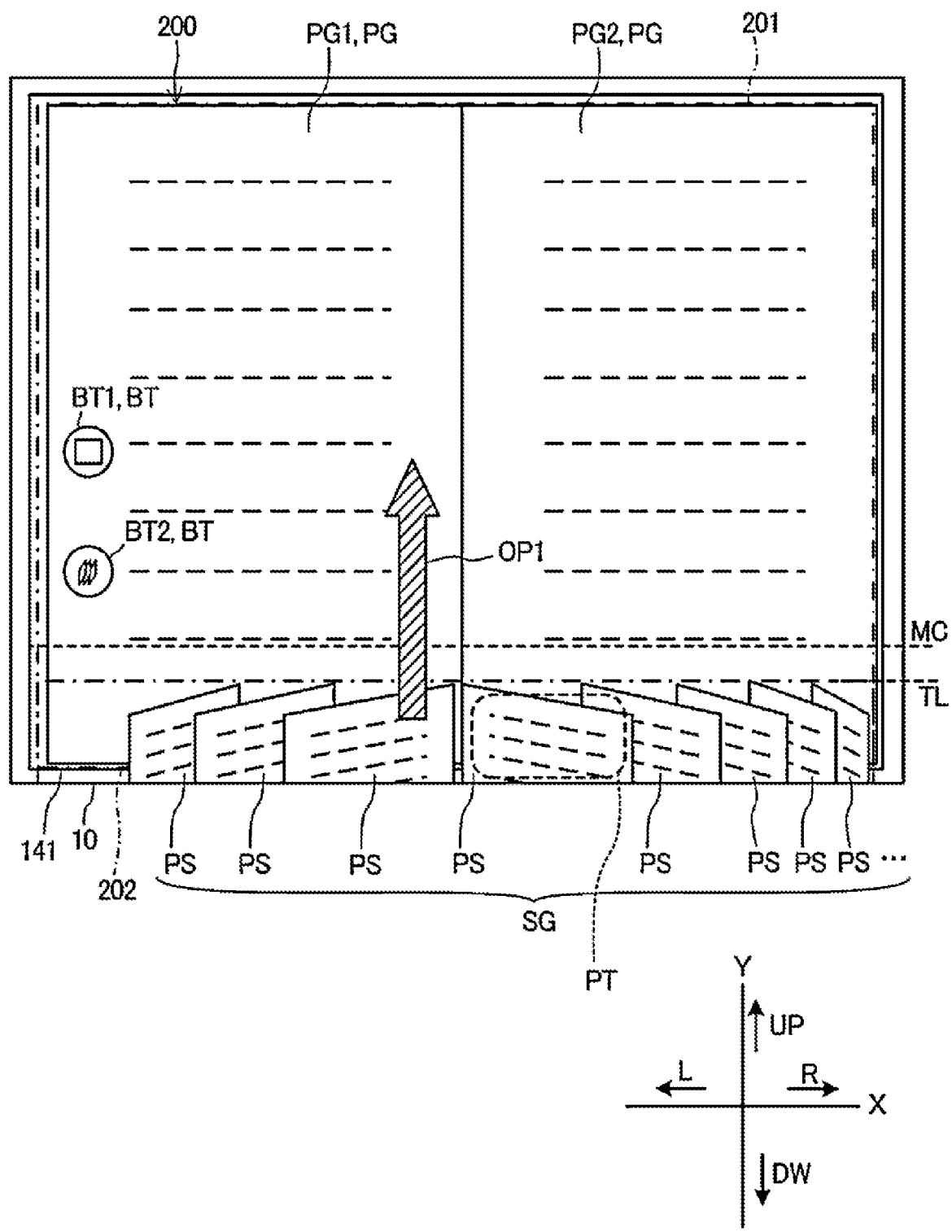
FIG. 3 illustrates an example of a preview screen in a main enlargement mode.
Figure 4:
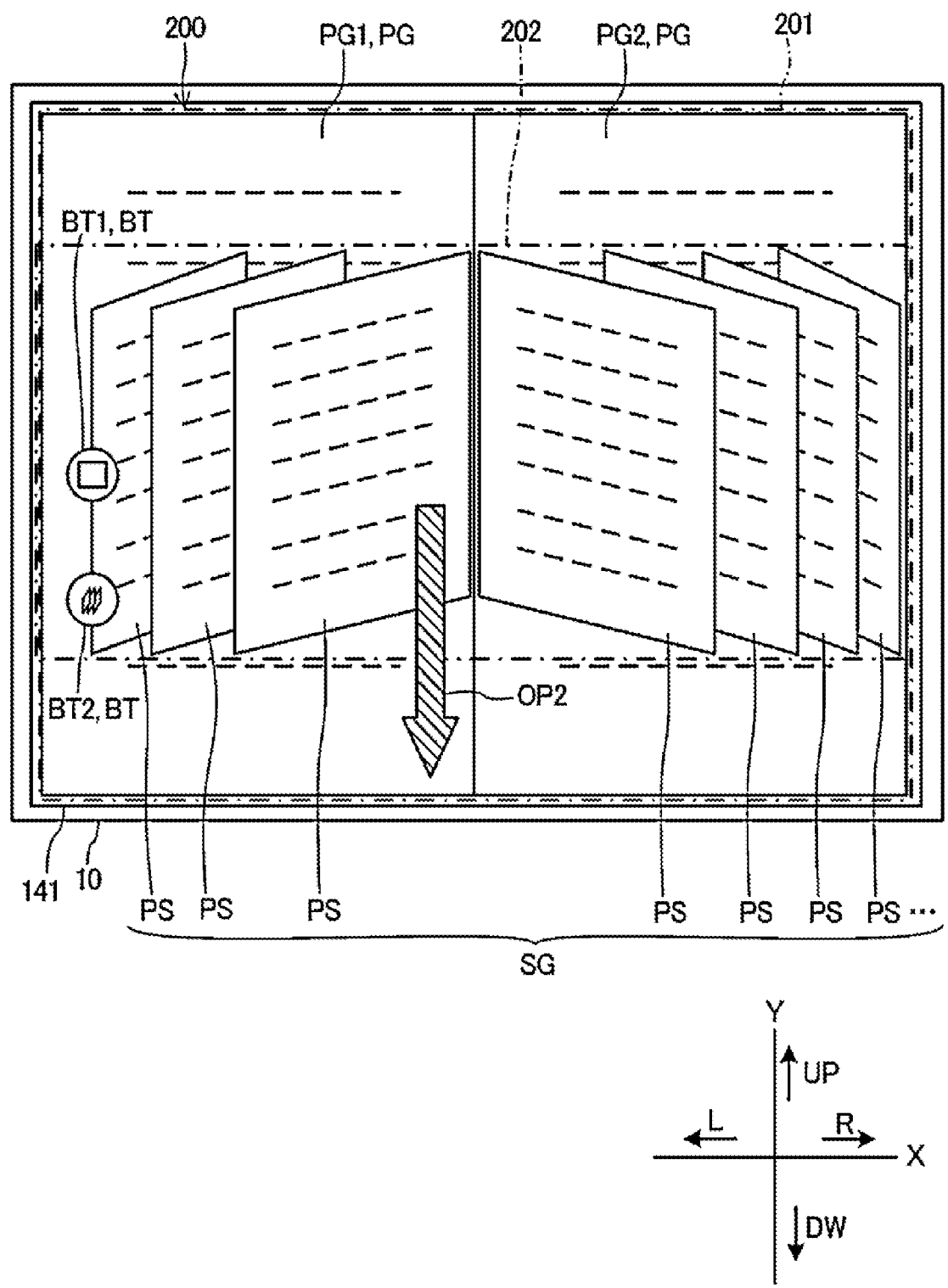
FIG. 4 illustrates an example of a preview screen in a thumbnail center mode.

An X-axis and a Y-axis are illustrated in FIG. 2 and FIG. 3 and FIG. 4, which will be described below, as references for directions the preview screen 200. The X-axis is parallel to the horizontal direction of the preview screen 200. The Y-axis is orthogonal to the X-axis and is parallel to the vertical direction of the preview screen 200. The X-axis is an example first axis, and the Y-axis is an example second axis.

In the drawings, directions R and L indicate directions in the X-axis direction, and directions UP and DW indicate directions in the Y-axis direction. The direction R corresponds to the right direction of the preview screen 200. The direction L corresponds to the leftward direction of the preview screen 200. The direction UP corresponds to the up direction of the preview screen 200. The direction DW corresponds to the down direction of the preview screen 200. These respective directions are expressed as a rightward direction R, a leftward direction L, an up direction UP, and a down direction DW in the description below, and orientations are defined by using these directions.

A page image PG is displayed in the document display area 201. The page image PG is an image of a page of a document and, as described above, an image generated in accordance with a print image PP. FIG. 2 illustrates two page images PG1 and PG2 displayed in the document display area 201. The page image PG1 and the page image PG2 are different page images. The page images PG1 and PG2 are described as a page image PG when the page images PG1 and PG2 are not distinguished from each other.

A thumbnail image group SG including thumbnail images PS of pages of a display-target document is displayed in the thumbnail display area 202. The thumbnail image group SG includes thumbnail images PS corresponding to at least some pages of the display-target document and may include thumbnail images PS corresponding to all pages. The thumbnail images PS show the content of the document in an inclined state in the thumbnail display area 202. Thumbnail images PS in a central area in the thumbnail display area 202 along the X-axis are displayed such that their respective content is legibly enlarged, and thumbnail images PS at both ends are displayed such that a plurality of thumbnail images PS overlap each other.

When a plurality of thumbnail images PS are displayed in the thumbnail display area 202, the thumbnail images PS are displayed such that tops of the respective thumbnail image PS in the thumbnail display area 202 are aligned at the same height. The tops of the respective thumbnail images PS are aligned at a top location TL in the example in FIG. 2. Such a display style ensures the visibility of the thumbnail images PS even if thumbnail images of different sizes or shapes exist in the thumbnail images PS displayed in the thumbnail display area 202.

The display control unit 121 moves thumbnail images PS in the thumbnail display area 202 in accordance with a user operation. For example, when the reception unit 122 receives a swipe operation for moving a thumbnail image PS in the leftward direction L or the rightward direction R, the display control unit 121 moves the thumbnail image PS in the direction in accordance with the swipe operation. Accordingly, the user can move a desired thumbnail image PS to the central area of the thumbnail display area 202.

In addition, when the reception unit 122 receives an operation for selecting one of the thumbnail images PS in the thumbnail display area 202, the display control unit 121 specifies a page corresponding to the selected thumbnail image PS. This operation will be described in detail below. The display control unit 121 displays a page image PG of the specified page in the document display area 201. This operation is, for example, a touch operation performed on the thumbnail image PS. In other words, a user selects a page of a document while viewing thumbnail images PS in the thumbnail display area 202 in a state in which the preview screen 200 is displayed, and an enlarged page image PG corresponding to the selected page is displayed in the document display area 201.

In the normal display mode, the document display area 201 and the thumbnail display area 202 do not overlap each other. Accordingly, the page image PG and the thumbnail image PS are displayed in a state in which the images do not overlap each other. In addition, each of the page image PG and the thumbnail image PS is displayed such that its entire page can be visually checked.

FIG. 2 illustrates page images PG of two pages displayed in the document display area 201. This display state is referred to as a two-page display mode. The normal display mode may include a one-page display mode in addition to the two-page display mode. In the one-page display mode, only one page image PG is displayed in the document display area 201 by the smart phone 1.

In the one-page display mode, for example, one page image PG is displayed in a central area of the document display area 201.

The display control unit 121 adjusts the display size of the page image PG to the size of the document display area 201 in the normal display mode. In both the right-left direction and the up-down direction, typically, the display of a page image PG is smaller than or equal to the document display area 201 in the right-left direction and has the maximum size. Here, the display control unit 121 maintains the aspect ratio of the page image PG when enlarging or reducing the page image PG. Here, the size of the page image PG refers to the whole of the page image PG displayed in the document display area 201. In the example in FIG. 2, the whole of the page image PG1 and the page image PG2 corresponds to the size of the page image PG.

Accordingly, when the page image PG is elongated in the up-down direction, that is, a vertically elongated image, the page image PG is the same size as the document display area 201 in the up-down direction as illustrated in FIG. 2. The document display area 201 has margins on a rightward direction R side and a leftward direction L side of the page image PG. In another case, for example, when the page image PG is elongated in the right-left direction, that is, a laterally elongated image, the page image PG is the same size as the document display area 201 in the right-left direction.

A button image BT is displayed on the preview screen 200. The button image BT according to the embodiment includes a first button image BT1 and a second button image BT2.

The button image BT is a floating button and can be displayed anywhere in the preview screen 200. The display control unit 121 may display the button image BT, for example, at any location overlapping a page image PG, any location overlapping a thumbnail image PS, or any location not overlapping a page image PG and a thumbnail image PS. The display control unit 121 may move a display location of the button image BT in accordance with a user flick operation.

The first button image BT1 and the second button image BT2 are used to issue instructions for switching display modes of the preview screen 200. The first button image BT1 is used to issue an instruction for switching the normal display mode illustrated in FIG. 2 and the main enlargement mode illustrated in FIG. 3. The second button image BT2 is used to issue instructions for switching to the thumbnail center mode illustrated in FIG. 4 and to return from the thumbnail center mode to the previous display mode.

In response to a touch operation performed on the first button image BT1 in the normal display mode in FIG. 2, the display control unit 121 switches the display mode of the preview screen 200 to the main enlargement mode in FIG. 3. In response to a touch operation performed on the second button image BT2 in the normal display mode in FIG. 2, the display control unit 121 switches the display mode of the preview screen 200 to the thumbnail center mode in FIG. 4. The first button image BT1 is an example of a "button". The operation performed on the first button image BT1 in the normal display mode is an example of a "first operation".

FIG. 3 illustrates an example of the preview screen 200 in the main enlargement mode. In the main enlargement mode, the document display area 201 is displayed in an enlarged state compared to that in the normal display mode. The document display area 201 is enlarged to the size of the preview screen 200 in the example illustrated in FIG. 3. In the main enlargement mode, the displayed page image PG is enlarged to the size of the document display area 201, which is larger than that in the normal display mode.

FIG. 3 illustrates two page images PG1 and PG2 displayed in the document display area 201 as one example. The display control unit 121 displays one page image PG in the main enlargement mode when the display mode is switched from the normal display mode in which the one page image PG corresponding to one page is displayed to the main enlargement mode.

The thumbnail display area 202 in the main enlargement mode in FIG. 3 is disposed in a bottom portion of the preview screen 200, similarly to the example in FIG. 2.

The thumbnail display area 202 overlaps the document display area 201 in the main enlargement mode. Accordingly, the thumbnail images PS are displayed such that the thumbnail images PS overlap the page image PG. Thumbnail images PS are displayed on the page image PG to enable the user to visually check the thumbnail images PS. In this state, the thumbnail display area 202 in the up-down direction in the main enlargement mode is shorter than the entire thumbnail image PS in the up-down direction to ensure the visibility of the page image PG. Accordingly, only part of the thumbnail image PS is displayed in the thumbnail display area 202.

A title, a page number, or the like may be displayed in a top portion of a page of a document. For example, a page top portion image PT indicated by the broken line in FIG. 3 typically include title characters and graphics in the thumbnail image PS. Accordingly, when only the top portion of the thumbnail image PS is displayed in the thumbnail display area 202, the user can visually check the title and the like in the top portion of the thumbnail image PS. In contrast, when only a bottom portion of the thumbnail image PS is displayed in the thumbnail display area 202, the user can obtain less information than that obtained from the thumbnail image PS. Accordingly, the top portion of the thumbnail image PS is displayed in the thumbnail display area 202 in the main enlargement mode, and the bottom portion of the thumbnail image PS is not displayed as if the bottom portion is out of the display area of the display 141.

In the main enlargement mode illustrated in FIG. 3, the document display area 201 and the thumbnail display area 202 overlap each other in the up-down direction. In other words, the thumbnail display area 202 is disposed on a bottom portion of the document display area 201. The thumbnail display area 202 in this display mode is reduced in the up-down direction such that the thumbnail images PS do not interfere with the user's visibility of the page image PG. The thumbnail display area 202 in the main enlargement mode is smaller than that in the normal display mode in the up-down direction. The thumbnail display area 202 is moved in the down direction DW compared to the thumbnail display area 202 in the normal display mode. The down direction DW is an example "first direction".

A typical document has a margin at the bottom of the page. FIG. 3 illustrates the bottom of characters or images in the page images PG1 and PG2 using the broken line as a bottom location MC. The space below the bottom location MC is a margin of the page images PG1 and PG2. The thumbnail images PS can be displayed so as not to interfere with the user's visibility to the body of the page image PG by setting the top location TL of the thumbnail images PS on or under the bottom location MC.

In addition, in the main enlargement mode, the thumbnail images PS are enlarged to a size greater than that in the normal display mode and displayed. The thumbnail images PS are enlarged, for example, to a size greater than that in the normal display mode in the right-left direction and displayed. The thumbnail display images PS may be enlarged to a size greater than that in the normal display mode in the up-down direction. Such enlargement processing may reduce the number of the thumbnail images PS displayed in the thumbnail display area 202 compared to that in the normal display mode. Enlarging thumbnail images PS increases the visibility to the thumbnail images PS compared to that in the normal display mode. Accordingly, the visibility reduced due to the thumbnail images PS displayed partially in the main enlargement mode can be compensated, enabling the user to see the content of the page using the thumbnail images PS.

The magnification for enlarging a thumbnail image PS may be determined in accordance with the shape of a page of a document, that is, the shape of the thumbnail image PS in switching from the normal display mode to the main enlargement mode. Specifically, the shape of a page is the aspect ratio of the page, which is the ratio of the length of the page in the right-left direction and the length of the page in the up-down direction. The shape of a page may be whether the page is vertically elongated or laterally elongated. The display control unit 121 may determine a standard size and an orientation of a page. The display control unit 121 determines, for example, that a page is an A6-standard-size paper in portrait orientation.

Two methods are provided for handling a display-target document including pages of different shapes for the display control unit 121. According to a first method, the display control unit 121 determines the shape of the top page of a document and determines that the determined shape of the page is the shape of the display-target document. The display-target document includes a plurality of pages arranged in a particular order. According to the first method, the display control unit 121 determines the shape of the first page to determine the shape of the display-target document without determining the shapes of the second page and the subsequent pages.

According to the second method, the display control unit 121 may determine the shapes of all pages of a display-target document and determine that the most common shape of the pages is the shape of the display-target document. According to the second method, processing is performed for the most common shape of the pages among the pages of the display-target document. In other words, processing for the most common shape in the display-target document is performed.

The thumbnail images PS according to the embodiment are displayed such that the images are arranged in the right-left direction in the thumbnail display area 202. When the display control unit 121 determines that the shape of pages is vertically elongated according to the first method, the second method, or other methods, the display control unit 121 sets the magnification of the thumbnail images PS to a first magnification. In contrast, when the display control unit 121 determines that the shape of pages is laterally elongated, the display control unit 121 sets the magnification of the thumbnail images PS to a second magnification that is smaller than the first magnification. A page having a vertically elongated shape means that the dimension in the right-left direction is smaller than that in the up-down direction. A page having a laterally elongated shape means that the dimension in the right-left direction is larger than that in the up-down direction. When the thumbnail images PS are three-dimensionally displayed in an inclined manner as illustrated in FIG. 2 to FIG. 4, in a case in which the shape of the pages is laterally elongated, inappropriate hiding may be seen in the display of overlapping adjacent thumbnail images PS, that is, so-called Z-fighting may occur. Such occurrence of Z-fighting can be suppressed by setting the second magnification to a magnification lower than the first magnification.

The display sizes and the display locations of the page image PG and the thumbnail images PS are changed when the display mode in the preview screen 200 is switched from the normal display mode to the main enlargement mode. In the switching processing, the display control unit 121 may gradually change the display sizes and the display locations of the page image PG and the thumbnail images PS in switching the display mode from the normal display mode to the main enlargement mode. The display control unit 121 may perform animation displaying in which a state between the normal display mode and the main magnification mode is smoothly changed while the display mode is switched from the normal display mode to the main magnification mode.

The button image BT is displayed on the preview screen 200 also in the main magnification mode. The functions of the first button image BT1 and the second button image BT2 are similar to those described above. In response to a touch operation performed on the first button image BT1 in the main enlargement mode, the display mode of the preview screen 200 is switched to the normal display mode. In response to a touch operation performed on the second button image BT2 in the main enlargement mode, the display mode of the preview screen 200 is switched to the thumbnail center mode illustrated in FIG. 4.

In response to a swipe operation or a flick operation of moving from a location on a thumbnail image PS in the up direction UP in the main enlargement mode as indicated in FIG. 3 by OP1, the display mode is switched to the thumbnail center mode. The operation OP1, that is, the swipe operation or the flick operation, is an example "second operation".

When the display mode is switched from the main enlargement mode to the normal display mode, the thumbnail display area 202 is moved in the up direction UP and the thumbnail images PS are reduced. When the display mode is switched from the main enlargement mode to the thumbnail center mode, the thumbnail display area 202 is moved in the up direction UP and the thumbnail images PS are enlarged as will be described below.

FIG. 4 illustrates an example of the preview screen 200 in the thumbnail center mode. In the thumbnail center mode, the thumbnail images PS are displayed at or near the center of the preview screen 200. In the thumbnail center mode, the document display area 201 is disposed in almost the whole of the preview screen 200 and the thumbnail display area 202 is disposed on the document display area 201, similarly to the main enlargement mode. The thumbnail center mode corresponds to a display state in which the thumbnail display area 202 is moved in the up direction UP from the main enlargement mode. The up direction UP is an example "second direction".

In the thumbnail center mode, the thumbnail display area 202 is larger than that in the normal display mode and the main enlargement mode. The display size of the thumbnail images PS is correspondingly larger than that in the normal display mode and the main enlargement mode, and the whole of each thumbnail image PS is displayed in the thumbnail display area 202. In the thumbnail center mode, the thumbnail images PS are enlarged and displayed in a central part of the preview screen 200, enabling the user to visually check the content of the thumbnail images PS.

As described above, the number of the thumbnail images PS displayed in the thumbnail display area 202 in the main enlargement mode may be less than that in the normal display mode as described above. The number of the thumbnail images PS displayed in the thumbnail display area 202 in the thumbnail center mode may be less than that in the normal display mode and the main enlargement mode.

In response to a swipe operation or a flick operation of moving from a location on a thumbnail image PS in the down direction DW in the preview screen 200 in the thumbnail center mode as indicated by OP2 in FIG. 4, the display state is switched to the main enlargement mode. The operation OP2, that is, the swipe operation or the flick operation, is an example "third operation. The down direction DW is an example "first direction".

The button image BT is displayed on the preview screen 200 also in the thumbnail center mode. The functions of the first button image BT1 and the second button image BT2 are similar to those described above. In response to a touch operation performed on the first button image BT1 in the thumbnail center mode, the display mode of the preview screen 200 is switched to the normal display mode. In response to a touch operation performed on the second button image BT2 in the thumbnail center mode, the display mode of the preview screen 200 is switched to the main enlargement mode.

When the display mode is switched from the thumbnail center mode to the main enlargement mode, the thumbnail display area 202 is moved in the down direction DW and the thumbnail images PS are reduced. When the display mode is switched from the thumbnail center mode to the normal display mode, the thumbnail display area 202 is moved in the down direction DW and the thumbnail images PS are reduced.

Figure 5:
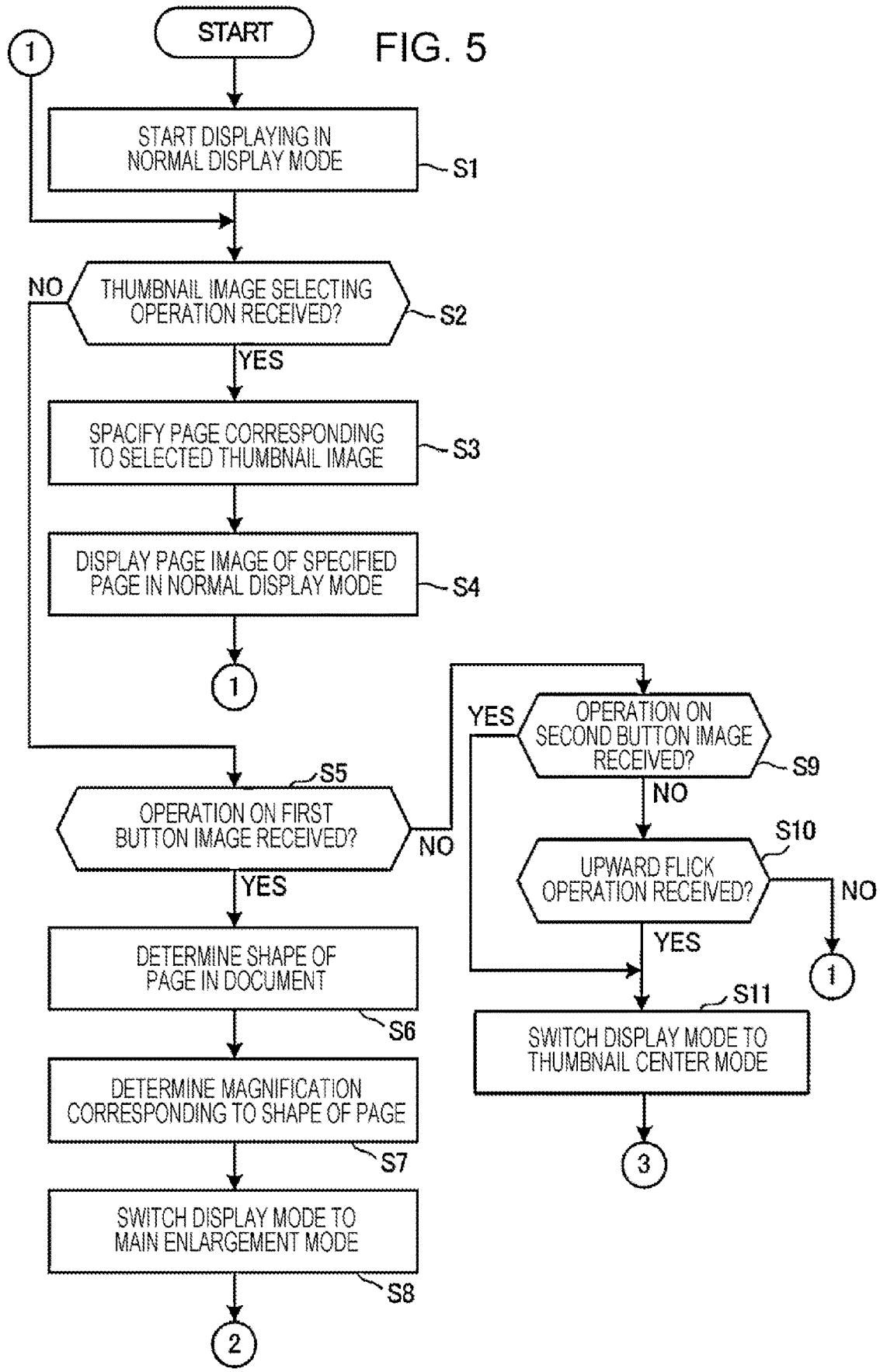
FIG. 5 is a flowchart illustrating processing performed by a controller in a smart phone.
Figure 6:
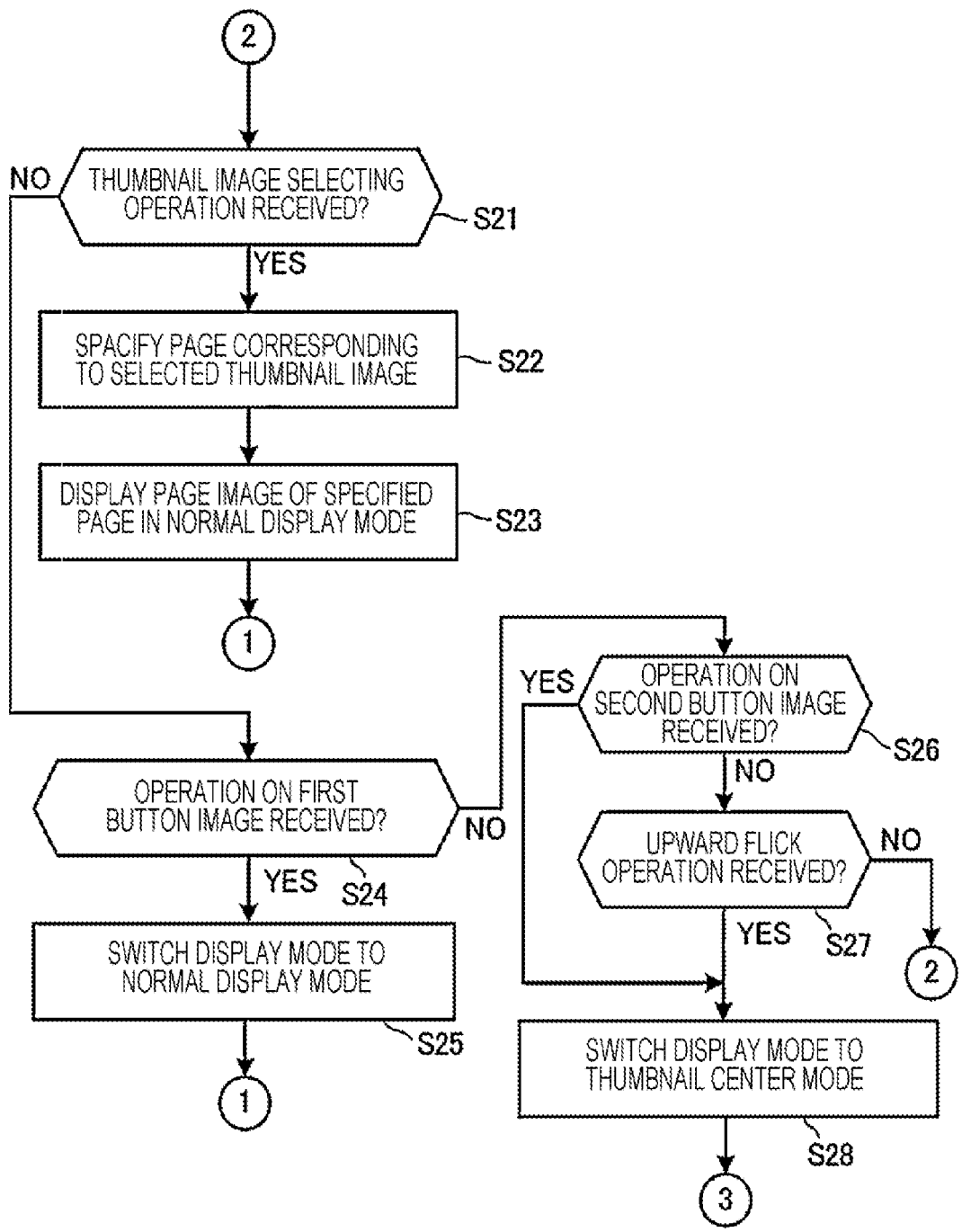
FIG. 6 is a flowchart illustrating processing performed by a controller in a smart phone.
Figure 7:
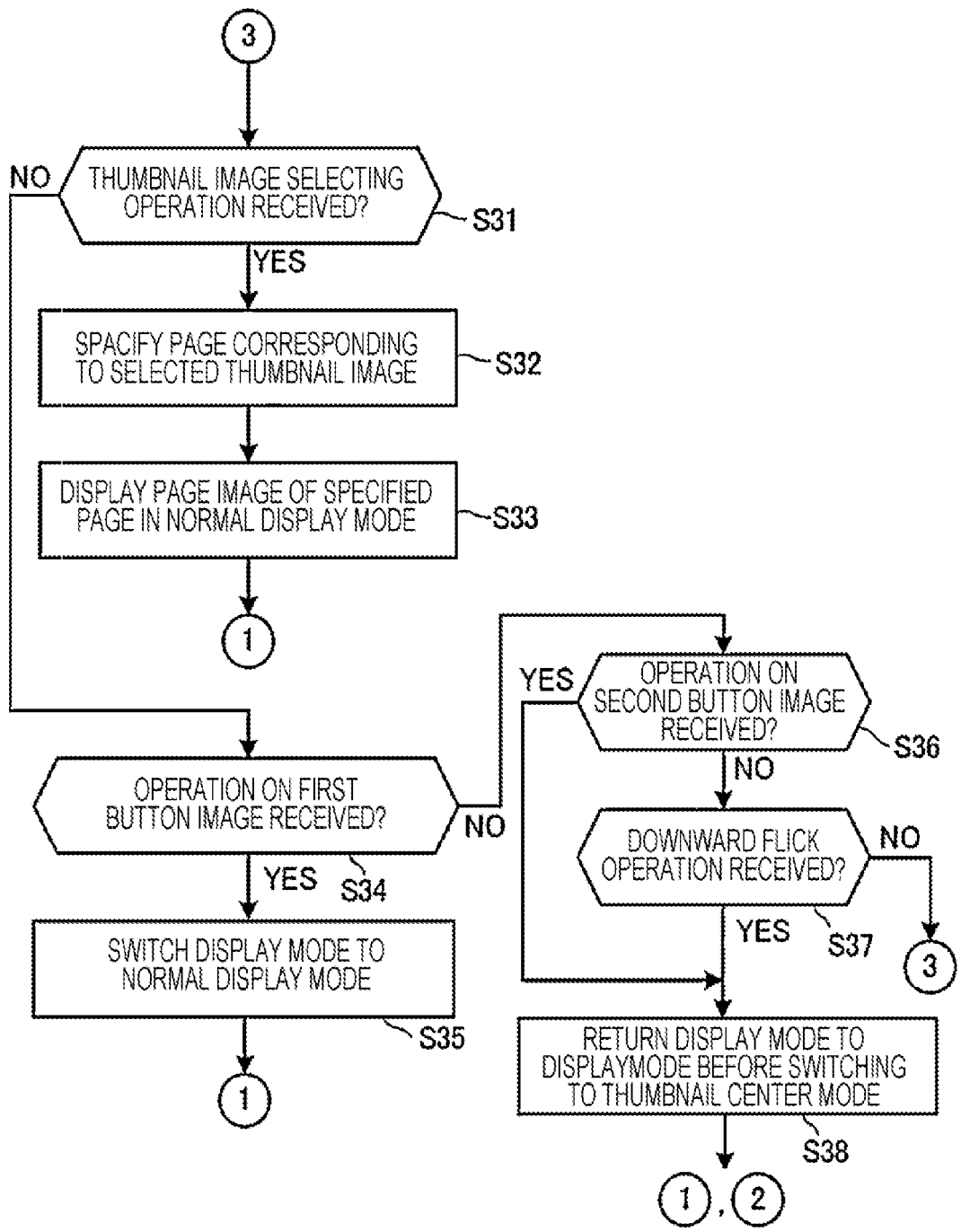
FIG. 7 is a flowchart illustrating processing performed by a controller in a smart phone.

FIG. 5, FIG. 6, and FIG. 7 are flowcharts illustrating the processing performed by the controller 11 in the smart phone 1. The processing in the drawings starts in response to the controller 11 loading the APP 132 and starting the APP 132 in accordance with a user operation. Although not illustrated in the drawings, the operation in FIG. 5, FIG. 6, or FIG. 7 is terminated when the running APP 132 is terminated or the smart phone 1 is switched off.

In step S1, the controller 11 displays a preview screen 200 in the normal display mode. At the start of displaying in step S1, the top page of a display-target document or a page displayed when the APP 132 was executed last is displayed on the document display area 201.

In step S2, the controller 11 determines whether the reception unit 122 has received an operation of selecting one of thumbnail images PS displayed in the thumbnail display area 202. The operation of selecting a thumbnail image PS is, for example, a touch operation or a tap operation at a location on a display location of a thumbnail image PS.

In response to an operation of selecting a thumbnail image PS (step S2; YES), the controller 11 proceeds to step S3. In step S3, the controller 11 specifies a page image PG corresponding to the thumbnail image PS selected by the user operation. In step S4, the controller 11 displays the page image PG specified in step S3 in the preview screen 200 by using the display control unit 121. The controller 11 then returns to step S2.

When an operation of selecting a thumbnail image PS has not been received (step S2; NO), the controller 11 proceeds to step S5. In step S5, the controller 11 determines whether the reception unit 122 has received an operation performed on the first button image BT1.

In response to receiving an operation performed on the first button image BT1 (step S5; YES), the controller 11 proceeds to step S6. In step S6, the controller 11 determines the shape of a page in the display-target document. In step S7, the controller 11 determines a magnification corresponding to the shape of the page determined in step S6. The controller 11, for example, sets a magnification to the first magnification or the second magnification described above. In step S8, the controller 11 switches the display mode of the preview screen 200 to the main enlargement mode in accordance with the magnification determined in step S7. The controller 11 then proceeds to step S21 (FIG. 6), which will be described below.

When an operation on the first button image BT1 has not been received (step S5; NO), the controller 11 proceeds to step S9. In step S9, the controller 11 determines whether the reception unit 122 has received an operation performed on the second button image BT2.

In response to receiving an operation performed on the second button image BT2 (step S9; YES), the controller 11 proceeds to step S11, which will be described below. When an operation on the second button image BT2 has not been received (step S9; NO), the controller 11 proceeds to step S10. In step S10, the controller 11 determines whether the reception unit 122 has received an operation of flicking in the up direction UP. An operation of flicking in the up direction UP is, for example, an operation OP1. When an operation of flicking in the up direction UP has not been received (step S10; NO), the controller 11 returns to step S2. In response to receiving an operation of flicking in the up direction UP (step S10; YES), the controller 11 proceeds to step S11.

In step S11, the controller 11 switches the display mode of the preview screen 200 to the thumbnail center mode by using the display control unit 121. The controller 11 then proceeds to step S31 illustrated in FIG. 7.

In step S21, the controller 11 determines whether the reception unit 122 has received an operation of selecting one of thumbnail images PS displayed in the thumbnail display area 202.

In response to an operation of selecting a thumbnail image PS (step S21; YES), the controller 11 proceeds to step S22. In step S22, the controller 11 specifies a page image PG corresponding to the thumbnail image PS selected by the user operation. In step S23, the controller 11 displays the page image PG specified in step S22 in the preview screen 200. In this processing, the display mode of the preview screen 200 is switched to the normal display mode. The controller 11 then returns to step S2.

When an operation of selecting a thumbnail image PS has not been received (step S21; NO), the controller 11 proceeds to step S24. In step S24, the controller 11 determines whether the reception unit 122 has received an operation performed on the first button image BT1.

In response to receiving an operation performed on the first button image BT1 (step S24; YES), the controller 11 proceeds to step S25. In step S25, the controller 11 switches the display mode of the preview screen 200 to the normal display mode. The controller 11 then returns to step S2.

When an operation on the first button image BT1 has not been received (step S24; NO), the controller 11 proceeds to step S26. In step S26, the controller 11 determines whether the reception unit 122 has received an operation performed on the second button image BT2.

In response to receiving an operation performed on the second button image BT2 (step S26; YES), the controller 11 proceeds to step S28, which will be described below. When an operation on the second button image BT2 has not been received (step S26; NO), the controller 11 proceeds to step S27. In step S27, the controller 11 determines whether the reception unit 122 has received an operation of flicking in the up direction UP. When an operation of flicking in the up direction UP has not been received (step S27; NO), the controller 11 returns to step S21. In response to receiving an operation of flicking in the up direction UP (step S27; YES), the controller 11 proceeds to step S28.

In step S28, the controller 11 switches the display mode of the preview screen 200 to the thumbnail center mode by using the display control unit 121. Then controller 11 proceeds to step S31 illustrated in FIG. 7.

In step S31, the controller 11 determines whether the reception unit 122 has received an operation of selecting one of thumbnail images PS displayed on the thumbnail display area 202. In response to an operation of selecting a thumbnail image PS (step S31; YES), the controller 11 proceeds to step S32. In step S32, the controller 11 specifies a page image PG corresponding to the thumbnail image PS selected by the user operation. In step S33, the controller 11 displays the page image PG specified in step S32 in the preview screen 200 in the normal display mode. Here, the display mode of the preview screen 200 is switched to the normal display mode. The controller 11 then returns to step S2.

When an operation of selecting a thumbnail image PS has not been received (step S31; NO), the controller 11 proceeds to step S34. In step S34, the controller 11 determines whether the reception unit 122 has received an operation performed on the first button image BT1.

In response to receiving an operation performed on the first button image BT1 (step S34; YES), the controller 11 proceeds to step S35. In step S35, the controller 11 switches the display mode of the preview screen 200 to the normal display mode. Then the controller 11 returns to step S2.

When an operation on the first button image BT1 has not been received (step S34; NO), the controller 11 proceeds to step S36. In step S36, the controller 11 determines whether the reception unit 122 has received an operation performed on the second button image BT2.

In response to receiving an operation performed on the second button image BT2 (step S36; YES), the controller 11 proceeds to step S38, which will be described below. When an operation on the second button image BT2 has not been received (step S36; NO), the controller 11 proceeds to step S37. In step S37, the controller 11 determines whether the reception unit 122 has received an operation of flicking in the down direction DW. An operation of flicking in the down direction DW is, for example, the operation OP2 illustrated in FIG. 4. When an operation of flicking in the down direction DW has not been received (step S37; NO), the controller 11 returns to step S31. In response to receiving an operation of flicking in the down direction DOWN (step S37; YES), the controller 11 proceeds to step S38.

In step S38, the controller 11, by using the display control unit 121, switches the display mode of the preview screen 200 to the display mode selected before switching to the thumbnail center mode. Here, when the controller 11 switches the display mode to the normal display mode, the controller 11 proceeds to step S2. When the controller 11 switches the display mode to the main enlargement mode in step S38, the controller 11 proceeds to step S21.

In the operation according to the embodiment, step S1 corresponds to an example "displaying step". Step S5 corresponds to an example "first receiving step". Step S8 corresponds to an example "enlarging step". Steps S9, S10, S26, and S27 correspond to examples of a "second receiving step". Steps S11 and S28 correspond to examples of a "moving step". Steps S36 and S37 correspond to examples of a "third receiving step". Step S38 corresponds to an example "returning step".

The thumbnail display area 202 in the normal display mode according to the embodiment may be disposed above the preview screen 200. In such a case, the thumbnail display area 202 may overlap an upper portion of the document display area 201 in the main enlargement mode. For example, the thumbnail display area 202 may be disposed on the top of the preview screen 200. In such a case, the thumbnail images may be in a display mode in which the top portions of the thumbnail images PS are displayed in the thumbnail display area 202 and bottom portions of the thumbnail images PS are not displayed. In such a case, as a "second operation", the display control unit 121 may switch the display mode to the thumbnail center mode in response to a flick operation or a swipe operation from a location on a thumbnail image PS in the down direction DW. In other words, contrary to the above-described embodiment, the up direction UP corresponds to an example "first direction", and the down direction DW corresponds to an example "second direction".

As described above, the display method according to the embodiment is a method of displaying a document by using the smart phone 1 having the display 141. This display method includes a displaying step of causing a page image PG that is an image of a page of the document and thumbnail images PS of pages to be displayed in the preview screen 200 on the display 141. The display method includes a first receiving step of receiving a first operation for issuing an instruction for enlarging the page image PG. The display method includes an enlarging step of, in response to receiving the first operation, causing the page image PG displayed in the preview screen 200 to be enlarged and displayed and causing the thumbnail images PS to be moved in a first direction in the preview screen 200. The display method, in the enlarging step, enlarges the thumbnail images PS compared to those before the execution of the enlarging step with some portions of the thumbnail images PS being hidden, and updates the display in the preview screen 200.

The smart phone 1 that executes the display method includes the touch panel 14 having the display 141. The smart phone 1 includes the display control unit 121 that displays a page image PG that is an image of a page of a document and thumbnail images PS of pages on the preview screen 200 in the display 141 and includes the reception unit 122 that receives an instruction. In response to the reception unit 122 receiving a first operation for issuing an instruction for enlarging a page image PG, the display control unit 121 performs a display updating processing for enlarging the page image PG displayed on the preview screen 200 and displaying the page image PG. The display control unit 121 moves the display locations of the thumbnail images PS in the first direction in the preview screen 200 in the display updating processing. The display control unit 121 enlarges the thumbnail images PS compared to those before the execution of the display updating processing with some portions of the thumbnail images PS being hidden.

According to the display method and the smart phone 1 that executes the display method, in displaying a preview screen 200, a page image PG is enlarged and displayed in accordance with an operation. Here, thumbnail images PS are enlarged with some portions of the thumbnail images PS being hidden. This processing enables the page image PG and at least some portions of the thumbnail images PS to be displayed such that the user can readily see the page image PG and at least some portions of the thumbnail images PS even if the display 141 is not large enough to display the page image PG and the thumbnail images PS.

The displaying step in the display method displays a thumbnail image group SG including thumbnail images PS of pages on the preview screen 200. The enlarging step in the display method moves the display location of the thumbnail image group SG in the first direction on the preview screen 200. In addition, the enlarging step enlarges the thumbnail image group SG compared to that before the execution of the enlarging step with some portions of at least some thumbnail images PS of the thumbnail image group SG being hidden. This processing enables the thumbnail image group SG to be moved with some portions of the thumbnail image group SG being hidden when enlarging the page image PG, ensuring the visibility of the page image PG even when the thumbnail images PS overlap the page image PG. Accordingly, the thumbnail images PS can be displayed such that the thumbnail images PS overlap the page image PG. This processing enables the page image PG to be displayed such that the user can readily see the page image PG even if the display 141 is small. In addition, at least some portions of the thumbnail images PS can be displayed such that the user can readily see the thumbnail images PS.

The display method, in the enlarging step, determines a magnification for enlarging the thumbnail image group SG compared to that before the execution of the enlarging step in accordance with a shape of a page of the document. This processing enables the magnification for enlarging the thumbnail images PS to be determined in accordance with a shape of a page. For example, in arranging and displaying thumbnail images PS, when the thumbnail images PS are three-dimensionally displayed in an inclined manner, an occurrence of Z-fighting can be suppressed. Accordingly, the thumbnail images PS can be displayed such that the user can more readily see the thumbnail images PS on the display 141 of a limited size.

The display method determines a shape of a page in the document in accordance with whether a shape of a top page of the pages in the document is vertically elongated or laterally elongated. By the processing, a shape of a page in the document can be readily determined.

The display method determines a shape of a page in the document in accordance with whether a percentage of vertically elongated pages in the pages in the document is greater than or equal to a criterion value or less than the criterion value. By the processing, a shape of a page in the document can be readily determined.

In the display method, the thumbnail image group SG includes a plurality of thumbnail images PS of the same shape as that of the page. The thumbnail images PS are displayed such that tops of the respective thumbnail images PS are aligned at the same height in the height direction in the display 141. The processing enables the thumbnail images PS to be displayed in an aligned state in moving the thumbnail image group SG in the up direction UP or in the down direction DW. In addition, since the tops of the thumbnail images PS are aligned, by displaying the upper portions of the thumbnail images PS so as not to be hidden, the user can readily see the upper portions of the thumbnail images PS.

The display method, in the displaying step, a button for operation is displayed on the preview screen 200, and in the first receiving step, when the first button image BT1 is operated, receives the first operation. This processing enables the user to perform a simple operation to switch the display modes.

The display method, in the enlarging step, processing for gradually enlarging the display size of the page image PG being displayed on the preview screen 200 is performed. This processing enable the user to readily see the change in display size of the page image PG.

The display method includes a second receiving step of receiving a second operation for causing the thumbnail images PS moved in the first direction in the enlarging step to move in a second direction that is opposite to the first direction. The display method further includes a moving step of moving the thumbnail images PS to locations overlapping the page image PG in response to receiving the second operation. The processing enables the thumbnail images PS to be switched to a display mode that provides a high visibility by moving the display locations of the thumbnail images PS in accordance with a user operation.

The display method, in the moving step, enlarges the thumbnail images PS compared to those before the execution of the moving step. Accordingly, the visibility of the thumbnail images PS can be further increased.

The display method includes a third receiving step of receiving a third operation for causing the thumbnail images PS moved in the second direction in the moving step to move in the first direction. The display method further includes a returning step of moving the thumbnail images PS to previous display locations set before the execution of the moving step in response to receiving the third operation. By the processing, the display mode in which the thumbnail images PS have been moved can be readily returned to the previous display mode.

The embodiment is an aspect of the disclosure and its modifications and applications may be made without departing from the scope of the disclosure.

The "display apparatus" according to the embodiment is the smart phone 1; however, the display apparatus is not limited to the smart phone 1. The "display apparatus" may include the processor 12, the memory 13, and the touch panel 14. The "display apparatus" may be a tablet terminal.

In this embodiment, as an example of the normal display mode for the preview screen 200, the two-page display mode in which two page images PG are included has been described. However, in the normal display mode, three or more page images PG may be arranged. For example, three page images PG may be arranged in the right-left direction.

The shape of the button image BT, the shape of the document display area 201, and the shape of the thumbnail display area 202 according to the embodiment may be appropriately changed. For example, the button image BT may be a rectangle or an oval. The document display area 201 and the thumbnail display area 202 may have a vertically elongated shape long in the up-down direction.

The preview screen 200 according the embodiment is displayed in the whole of the display 141; however, it is not limited to this example. The preview screen 200 and a screen displayed by another application program may be arranged on the display 141. The preview screen 200 may be disposed in part of a home screen displayed by the OS 131.

The display method according to the embodiment is implemented by executing the OS 131 and the APP 132 stored in the memory 13 by using the processor 12 in the smart phone 1, which is an example. A non-transitory computer-readable storage medium storing a program to be performed by the processor 12 to implement the display method, or a transmission medium for transmitting the program may be provided. Here, the storage medium may be a magnetic or optical storage medium or a semiconductor memory device. The storage medium may be a flexible disk, a hard disk drive (HDD), a compact disc read-only memory (CD-ROM), a digital versatile disc (DVD), a Blu-ray Disc (registered trademark), a magneto-optical disk, a flash memory, a portable storage medium such as a card-type storage medium, or a fixed storage medium. Such a storage medium may be nonvolatile storage that is internal storage provided in a server device configured to communicate with the smart phone 1, such as random access memory (RAM), read-only memory (ROM), or a HDD. In such a case, the smart phone 1 downloads a program from a server device.

The functions of the controller 11 may be implemented by one or more processors or semiconductor chips. The controller 11 may further include a co-processor, such as a System on a Chip (SoC), a microcontroller unit (MCU), or a field programmable gate array (FPGA). The controller 11 may perform various control processing in combination with a CPU and a co-processor or by selectively using either a CPU or a co-processor.

The process units in the flowcharts illustrated in FIG. 5, FIG. 6, and FIG. 7 are divided according to major processing content to facilitate understanding of the operations of the controller 11, and are not limited by the definition or names of the process units. The process units in the flowcharts may be divided into more process units in accordance with the processing content. One process unit may include more processes. The order of processes may be changed appropriately without departing from the scope of the disclosure.

The functional components illustrated in FIG. 1 are merely functional examples and not particularly limited to specific implementations. It is not always necessary to mount hardware corresponding to each functional component, and a single processor may execute a program to implement the functions of a plurality of functional components. In the above-described embodiments, part of the functions implemented by software may be configures as hardware, or part of the functions implemented by hardware may be implemented by software. Detailed specific configurations of other components of the smart phone 1 may be modified without departing from the scope of the disclosure.

What is claimed is:

1. A display method of causing a display apparatus having a display screen to display a document, the method comprising:
    displaying a page image that is an image of a page of the document in a document display area and thumbnail images of pages in a thumbnail display area on the display screen;
    receiving a first operation for issuing an instruction for enlarging the page image; and
    in response to receiving the first operation:
        enlarging the page image displayed in the document display area and enlarging the thumbnail images in the thumbnail display area; and
        moving the thumbnail display area in a first direction in the display area so that a size of the moved thumbnail display area is decreased from a size of the thumbnail display area, wherein
    some portions of the thumbnail images are hidden from the moved thumbnail display area, and
    a part of each enlarged thumbnail image are displayed in the moved thumbnail display area and the other parts of each enlarged thumbnail image are not displayed in the moved thumbnail display area.

2. The display method according to claim 1, wherein displaying the page image includes displaying a thumbnail image group including the thumbnail images of the pages in the thumbnail display area, and
    enlarging the page image includes moving a display location of the thumbnail image group in the first direction in the moved thumbnail display area, and enlarging the thumbnail image group compared to that before enlarging the page image with some portions of at least some thumbnail images in the thumbnail image group being hidden.

3. The display method according to claim 2, wherein enlarging the page image includes determining a magnification for enlarging the thumbnail image group compared to that before enlarging the page image in accordance with a shape of a page in the document.

4. The display method according to claim 3, wherein a shape of a page in the document is determined in accordance with whether a shape of a top page of the pages in the document is vertically elongated or laterally elongated.

5. The display method according to claim 3, wherein a shape of a page in the document is determined in accordance with whether a percentage of vertically elongated pages in the pages in the document is greater than or equal to a criterion value or less than the criterion value.

6. The display method according to claim 2, wherein the thumbnail image group includes a plurality of thumbnail images of the same shape as the shape of the page, and the thumbnail image group is displayed such that tops of the thumbnail images are aligned at the same height in a height direction in the display screen.

7. The display method according to claim 1, wherein displaying the page image includes displaying an operation button in the document display area, and
    receiving the first operation is performed when the operation button is operated.

8. The display method according to claim 1, wherein enlarging the page image includes performing processing for gradually enlarging the display size of the page image being displayed on the document display area.

9. The display method according to claim 1, wherein enlarging the page image includes receiving a second operation for causing the thumbnail images moved in the first direction to move in a second direction that is opposite to the first direction, and
wherein the display method further comprises moving the thumbnail images to locations overlapping the page image in response to receiving the second operation.

10. The display method according to claim 9, wherein moving the thumbnail images includes enlarging the thumbnail images compared to those before moving the thumbnail images.

11. The display method according to claim 9, wherein moving the thumbnail images includes receiving a third operation for causing the thumbnail images moved in the second direction to move in the first direction; and
the display method further comprises moving the thumbnail images to previous display locations before moving the thumbnail images in the first direction in response to receiving the third operation.

12. A display apparatus comprising:
a display section having a display area including a document display area and a thumbnail display area on a display screen; and
a processor to:
  cause the display apparatus to display in the document display are a page image that is an image of a page of the document and in the thumbnail display are thumbnail images of pages; and
  receive an operation for issuing an instruction for enlarging the page image, and
in response to receiving the operation:
  perform display updating processing for enlarging the page image displayed in the document display area and the thumbnail images in the thumbnail display area and displaying the enlarged page image and the enlarged thumbnail images, and
  in the display updating processing, move the thumbnail display area in a first direction in the display area so that a size of the moved thumbnail display area is decreased from a size of the thumbnail display area, wherein
some portions of the thumbnail images are hidden from the moved thumbnail display area, and
a part of each enlarged thumbnail image are displayed in the moved thumbnail display area and the other parts of each enlarged thumbnail image are not displayed in the moved thumbnail display area.

* * * * *